June 25, 1929.  L. C. VAN PATTEN  1,718,503

ROTARY ROD WEEDER

Filed Oct. 26, 1927

INVENTOR
Louis C. Van Patten

BY
Albert R. Dietrich
ATTORNEY

Patented June 25, 1929.

1,718,503

UNITED STATES PATENT OFFICE.

LOUIS C. VAN PATTEN, OF CHENEY, WASHINGTON.

ROTARY-ROD WEEDER.

Application filed October 26, 1927. Serial No. 228,828.

This invention relates to that type of rotary rod weeders disclosed in my former Letters Patent No. 1,586,925, issued June 1, 1926 and Letters Patent No. 1,592,545, issued July 13, 1926, and it particularly has for its object to simplify and improve the construction of the weeder shown in Patent No. 1,592,545 as well as to provide means whereby the rotary rod driving mechanism may be disconnected at will from the driver wheel, thus facilitating transportation from one field or place to another.

The invention resides in those novel features, combination and arrangement of parts hereinafter described and set forth in the appended claims, reference being had to the accompanying drawing, in which:—

Figure 1:
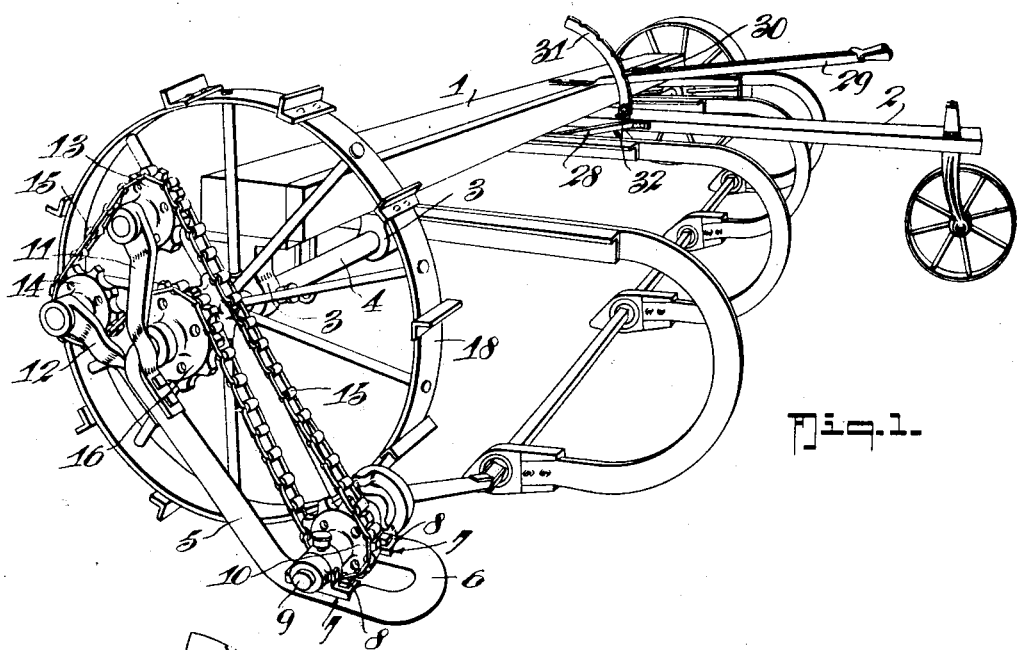
Figure 1 is a perspective view of a weeder embodying my present invention.
Figure 2:
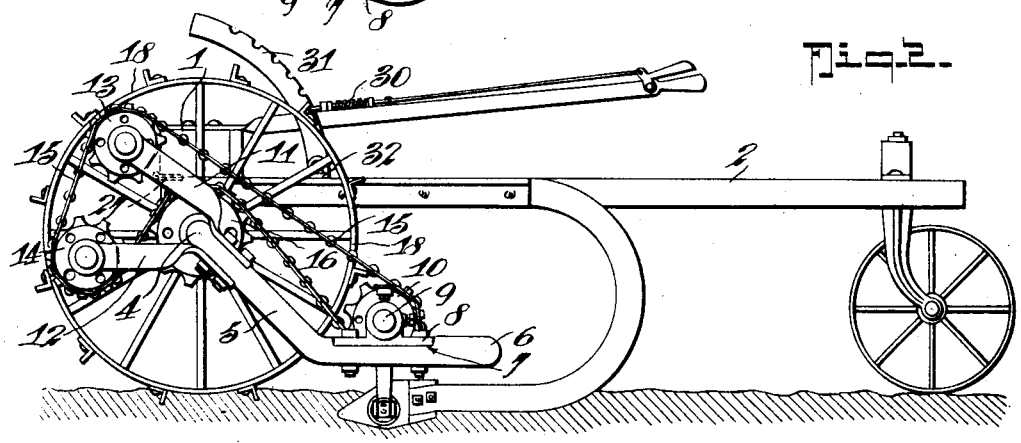
Figure 2 is a side elevation of the same.
Figure 3:
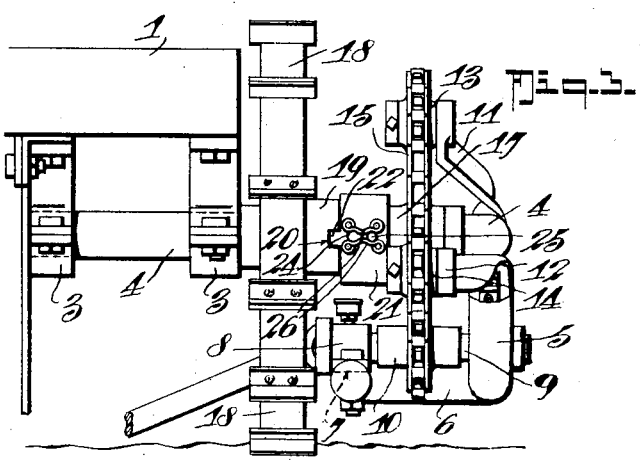
Figure 3 is an enlarged front elevation of a portion of the weeder.
Figure 4:
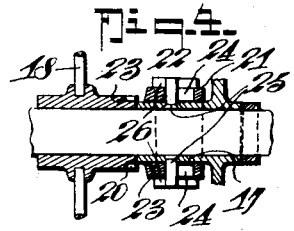
Figure 4 is a detail longitudinal section of the same.

Referring now to the drawing in which like numerals of reference indicate like parts in all the figures, 1 is the beam to which the balancing or tiller board 2 is connected. The beam is provided with holding brackets 3 for the rod 4 which is rigidly held by the brackets 3 against turning.

The rod 4 is bent to provide a rearwardly extending portion 5 that terminates in a U-shaped end 6 which is preferably provided with flat portions 7 to which the bearings 8 of the driven shaft 9 are secured.

The driven shaft 9 carries a sprocket 10 for a purpose presently understood.

Secured to the rearwardly extending portion 5 of the rod are brackets 11 and 12 which support idlers 13 and 14 respectively. A driving chain 15 passes over these idlers and over the sprocket 10 and a sprocket 16 on a sleeve 17 which is mounted to turn on a portion of the rod 4.

18 is the driving wheel which is mounted on the rod 4 and which has a hub 19 provided with a clutch portion 20 to cooperate with the clutch portion 22 of a shiftable clutch sleeve 21 that is carried on the sleeve 17. The clutch elements 20 and 22 may have beveled portions 23 for the insertion of a prying tool (such as a screw driver for instance) by which the clutch may be unmeshed.

The shiftable clutch sleeve 21 has slots 24 in which the driving pins 25 that are secured to the sleeve 17 are located. The connection between the sleeve 17 and the clutch sleeve 21 via pins and slots is such that the clutch sleeve will turn with the sleeve 17 but may have motion along the direction of its axis for the purpose of clutching and unclutching with the driving wheel hub 19.

In order to retain the clutch sleeve 21 in either of its positions any suitable holding device may be provided as for instance a spring device 26 having two holding portions to grip the pin 25.

The balancing board or tiller board 2 is preferably hinged at 27 to the beam 1 and braced at 28, there being an adjusting lever 29 secured to the beam and provided with a catch 30 to cooperate with the rack segment 31 that is connected at 32 with the balancing or tiller board 2. The parts 27 to 32 inclusive cooperate with the parts 1 and 2 and constitute a lifting device by means of which the rod may be removed from the ground when the weeder is being transported from place to place.

From the foregoing it will be seen that I have simplified the construction illustrated in my patents hereinbefore referred to and considerably reduced the cost of manufacture. Furthermore by providing the lifting device and the clutch device for throwing the rod out of action it will be seen that it will require considerably less effort to transport the machine from place to place than would otherwise be the case.

From the foregoing description, taken in connection with the accompanying drawing, it is thought the complete construction, operation and advantages of my invention will be clear to those skilled in the art to which it relates.

What I claim is:

1. A device of the class described, comprising a transverse beam, a board extending rearwardly therefrom, standards carried by the beam, bearings carried by the standards, a rotary rod journaled in the bearings, means to support one end of the beam above the ground, a fixed rod secured to the other end of the beam, a driver wheel carried by the fixed rod, means carried by the fixed rod and constituting a connection between said driver wheel and said rotary rod for transmitting the motion of the driver wheel to the rotary rod, said board being hinged to said beam, and a lever and segment device connecting said beam and board whereby the angle between the same may be varied.

2. A device of the class described, comprising a transverse beam, a board extending rearwardly therefrom, standards carried by the beam, bearings carried by the standards, a rotary rod journaled in the bearings, means to support one end of the beam above the ground, a fixed rod secured to the other end of the beam, a driver wheel carried by the fixed rod, means carried by the fixed rod and constituting a connection between said driver wheel and said rotary rod for transmitting the motion of the driver wheel to the rotary rod, and means supporting the rear end of the said board a fixed distance above the ground, said board being hinged to said beam and a lever and segment device connecting said beam and board, all being arranged to provide a lifting device for the purposes specified.

3. In rotary rod weeders, a transverse beam, standards carried by said beam, rod bearings carried by the standards, a rotary rod journaled in said bearings, a board secured to and projecting from the beam at substantially right angles to the same, means to sustain the beam above the ground, said means including at one end of the beam a fixed rod secured to the beam, a driving wheel mounted on said fixed rod, said fixed rod having a rearwardly extended portion, bearings on said rearwardly extended portion, a driven shaft journaled in said last named bearings, a driving connection between said driven shaft and said rotary rod, and a driving connection between said driving wheel and said driven shaft.

4. In rotary rod weeders, a transverse beam, standards carried by said beam, rod bearings carried by the standards, a rotary rod journaled in said bearings, a board secured to and projecting from the beam at substantially right angles to the same, means to sustain the beam above the ground, said means including at one end of the beam a fixed rod secured to the beam, a driving wheel mounted on said fixed rod, said fixed rod having a rearwardly extended portion terminating in a U end, bearings on said rearwardly extended portion, a driven shaft journaled in said last named bearings, a driving connection between said driven shaft and said rotary rod, and a driving connection between said driving wheel and said driven shaft.

5. In rotary rod weeders, a transverse beam, standards carried by said beam, rod bearings carried by the standards, a rotary rod journaled in said bearings, a board secured to and projecting from the beam at substantially right angles to the same, means to sustain the beam above the ground, said means including at one end of the beam a fixed rod secured to the beam, a driving wheel mounted on said fixed rod, said fixed rod having a rearwardly extended portion, bearings on said rearwardly extended portion, a driven shaft journaled in said last named bearings, a driving connection between said driven shaft and said rotary rod, a driving connection between said driving wheel and said driven shaft, said last named driving connection comprising a driving sprocket on the fixed rod, a sprocket on said driven shaft and a driving chain taking over said sprockets, together with a driving connection between said driving sprocket and said driving wheel.

6. In rotary rod weeders, a transverse beam, standards carried by said beam, rod bearings carried by the standards, a rotary rod journaled in said bearings, a board secured to and projecting from the beam at substantially right angles to the same, means to sustain the beam above the ground, said means including at one end of the beam a fixed rod secured to the beam, a driving wheel mounted on said fixed rod, said fixed rod having a rearwardly extended portion, bearings on said rearwardly extended portion, a driven shaft journaled in said last named bearings, a driving connection between said driven shaft and said rotary rod, a driving connection between said driving wheel and said driven shaft, said last named driving connection comprising a driving sprocket on the fixed rod, a sprocket on said driven shaft and a driving chain taking over said sprockets, and a shiftable clutch connection between said driving sprocket and said driving wheel.

7. In rotary rod weeders, a transverse beam, standards carried by said beam, rod bearings carried by the standards, a rotary rod journaled in said bearings, a board secured to and projecting from the beam at substantially right angles to the same, means to sustain the beam above the ground, said means including at one end of the beam a fixed rod secured to the beam, a driving wheel mounted on said fixed rod, said fixed rod having a rearwardly extended portion, bearings on said rearwardly extended portion, a driven shaft journaled in said last named bearings, a driving connection between said driven shaft and said rotary rod, a driving connection between said driving wheel and said driven shaft, said last named driving connection comprising a driving sprocket on the fixed rod, a sprocket on said driven shaft and a driving chain taking over said sprockets, and a shiftable clutch connection between said driving sprocket and said driving wheel, said driving sprocket having a sleeve, said shiftable clutch connection comprising a clutch sleeve shiftably mounted on and to turn with said driving sprocket sleeve and having a clutch portion, said driving wheel having a clutch portion to cooperate with the clutch portion of said shiftably mounted sleeve for the purposes described.

8. In rotary rod weeders of the type employing a beam with a driving wheel mounted at the end thereof; a shaft secured to the beam parallel thereto and on which the driving wheel is mounted, said shaft being bent at right angles to provide a portion extending rearwardly, said rearwardly extending portion terminating in a U end, bearings mounted on said U end, a driven shaft journaled in said bearings and adapted for connection with the rotary rod, a driving member mounted on said secured shaft to be driven by said driving wheel, and power transmission means connecting said driving member and said driven shaft.

9. In rotary rod weeders of the type employing a beam with a driving wheel mounted in the end thereof; a shaft secured to the beam parallel thereto and on which the driving wheel is mounted, said shaft being bent at right angles to provide a portion extending rearwardly, said rearwardly extending portion terminating in a U end, bearings mounted on said U end, a driven shaft journaled in said bearings and adapted for connection with the rotary rod, a driving member mounted on said secured shaft to be driven by said driving wheel, and power transmission means connecting said driving member and said driven shaft, said power transmission means including a sprocket on said driving member, a sprocket on said driven shaft and a driving chain taking around said sprockets.

10. In rotary rod weeders of the type employing a beam with a driving wheel mounted in the end thereof; a shaft secured to the beam parallel thereto and on which the driving wheel is mounted, said shaft being bent at right angles to provide a portion extending rearwardly, said rearwardly extending portion terminating in a U end, bearings mounted on said U end, a driven shaft journaled in said bearings and adapted for connection with the rotary rod, a driving member mounted on said secured shaft to be driven by said driving wheel, and power transmission means connecting said driving member and said driven shaft, said power transmission means including a sprocket on said driving member, a sprocket on said driven shaft and a driving chain taking around said sprockets, together with brackets carried by a portion of said secured shaft, and idler sprockets carried by said brackets over which said chain passes.

LOUIS C. VAN PATTEN.